United States Patent [19]

Nichols

[11] 4,203,288
[45] May 20, 1980

[54] HYDROKINETIC TORQUE CONVERTER MECHANISM WITH COMPOUND IMPELLER

[75] Inventor: Robert W. Nichols, Canton, Mich.

[73] Assignee: Ford Motor Company, Dearborn, Mich.

[21] Appl. No.: 966,974

[22] Filed: Dec. 6, 1978

[51] Int. Cl.² .............................................. F16D 33/00
[52] U.S. Cl. ........................................ 60/345; 60/347; 60/367; 192/3.31; 192/103 B
[58] Field of Search ................. 60/343, 345, 347, 353, 60/367; 192/3.28, 3.31, 103 B, 105 B

[56] References Cited

U.S. PATENT DOCUMENTS

| | | | |
|---|---|---|---|
| 3,079,756 | 3/1963 | Farrell | 60/343 |
| 3,189,144 | 6/1965 | Gabriel | 192/3.29 |
| 3,205,662 | 9/1965 | Gabriel | 60/343 |
| 3,212,357 | 10/1965 | Knowles et al. | 74/677 |
| 3,238,727 | 3/1966 | Gabriel | 60/343 |
| 4,090,417 | 5/1978 | Burcz et al. | 74/864 |

Primary Examiner—Edgar W. Geoghegan
Attorney, Agent, or Firm—Donald J. Harrington; Keith L. Zerschling

[57] ABSTRACT

A hydrokinetic torque converter transmission for multiplying torque delivered from a driving member to a driven member comprising a bladed impeller connected to the driving member, a bladed turbine connected to the driven member and a stator located between the flow exit section of the turbine and the flow entrance section of the impeller, said impeller comprising a main impeller blade section and an auxiliary impeller blade section, the latter being located radially outward with respect to the former, and a centrifugally operated clutch structure for connecting together for rotation in unison the auxiliary impeller blade section and the main impeller blade section at high impeller speeds and for disengaging them when the impeller speed is less than a predetermined value.

12 Claims, 2 Drawing Figures

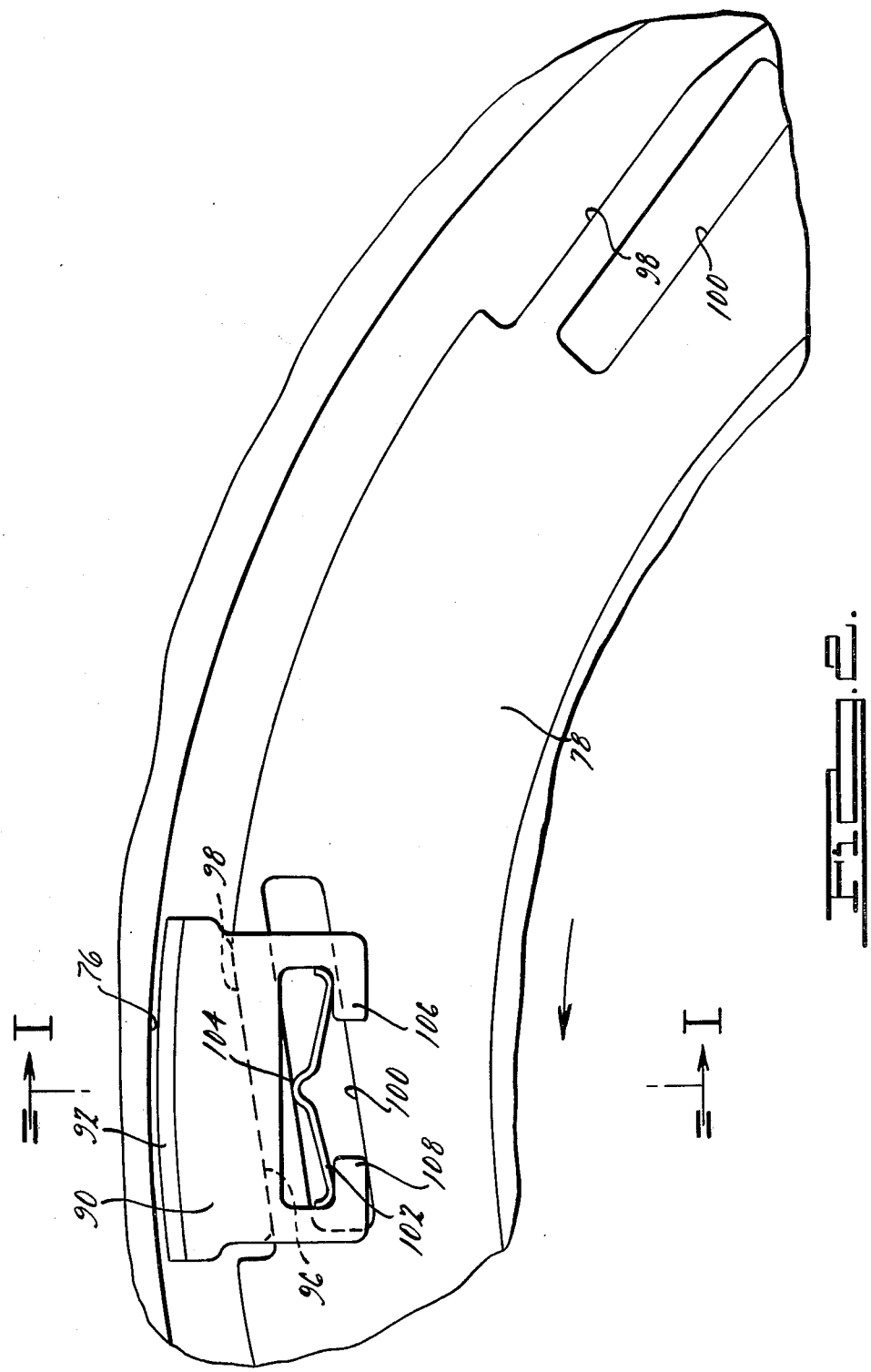

HYDROKINETIC TORQUE CONVERTER MECHANISM WITH COMPOUND IMPELLER

BRIEF DESCRIPTION OF THE INVENTION

My invention comprises improvements in a hydrokinetic torque converter mechanism having a bladed turbine, a bladed stator and a bladed impeller arranged in toroidal fluid flow relationship whereby the converter is capable of multiplying hydrokinetically the impeller torque to produce a turbine torque of higher value that is related functionally to the speed ratio. When the converter is used in an automotive vehicle dyiveline, the impeller is connected to the vehicle engine; and the turbine is connected to a torque input element of a multiple ratio power transmission mechanism. Examples of such power transmission mechanisms are shown in U.S. Pat. Nos. 3,212,357 and 4,090,417.

As discussed by Gabriel in his U.S. Pat. No. 3,189,144, the torque ratio that is developed by the hydrokinetic converter depends upon the blade geometry of the bladed members. If the effective impeller blade exit angle is changed by use of an auxiliary impeller as described by Mr. Gabriel, the speed ratio that can be achieved when the turbine is stalled can be altered. This also affects the torque ratio. Another patent reference of interest is Gabriel U.S. Pat. No. 3,205,662 which shows an auxiliary impeller with the impeller clutch at a forward location. U.S. Pat. No. 3,238,727 shows an auxiliary impeller clutch in the hub of the impeller. The relationship between speed ratio and torque ratio may be described as the so-called size factor "K", which equals the impeller speed divided by the square root of the impeller torque at that speed.

It is usual practice to allow the torque converter to remain active as the vehicle coasts and comes to a stop with the engine idling. Under such conditions the vehicle engine must be tuned to permit a sufficient engine idle speed to be developed to avoid roughness in the engine operation at idle as the converter continues to deliver torque at a reduced level. By employing the compound impeller construction of my invention, it is possible to alter the effective size factor "K" in the converter when the engine idles thereby substantially reducing or even eliminating torque transfer from the engine to the gearing when the engine is idling with the vehicle stalled. This makes possible an adjustment of the engine idle for the zero torque condition thereby substantially improving the overall fuel economy for the engine.

The auxiliary impeller blade section is disengaged from the main impeller blade section by a centrifugally operated clutch which is spring loaded to a clutch release position. When the clutch is released at idle speeds, the auxiliary blade section is capable of freewheeling or floating in the torus circuit; and the effective blade geometry is determined only by the main impeller blade section. As the engine is accelerated during normal operation, a centrifugal clutch connects together the blade sections so that the effective blade exit angle for the impeller is determined by the auxiliary blade geometry.

By appropriately calibrating the impeller blading, it is possible also to cause the centrifugally operated clutch to become actuated at a relatively high impeller speed; and this would cause the converter to operate in either of two performance ranges as described in Gabriel U.S. Pat. No. 3,189,144. Gabriel describes an auxiliary impeller and a clutch for connecting an auxiliary impeller to the main impeller, but the clutch is pressure operated and is located externally with respect to the torus circuit of the converter. The flow vector diagrams of the Gabriel patent, however, would apply in this instance, and the geometric characteristics of the auxiliary blade characteristics of the Gabriel construction could be made the same as the auxiliary blade characteristics of the present invention.

BRIEF DESCRIPTION OF THE FIGURES OF THE DRAWINGS

FIG. 1 is taken along the plane of section line 1—1 of FIG. 2.

FIG. 2 is a cross-sectional view taken along the plane of section line 2—2 of FIG. 1.

PARTICULAR DESCRIPTION OF THE INVENTION

Figure 1:
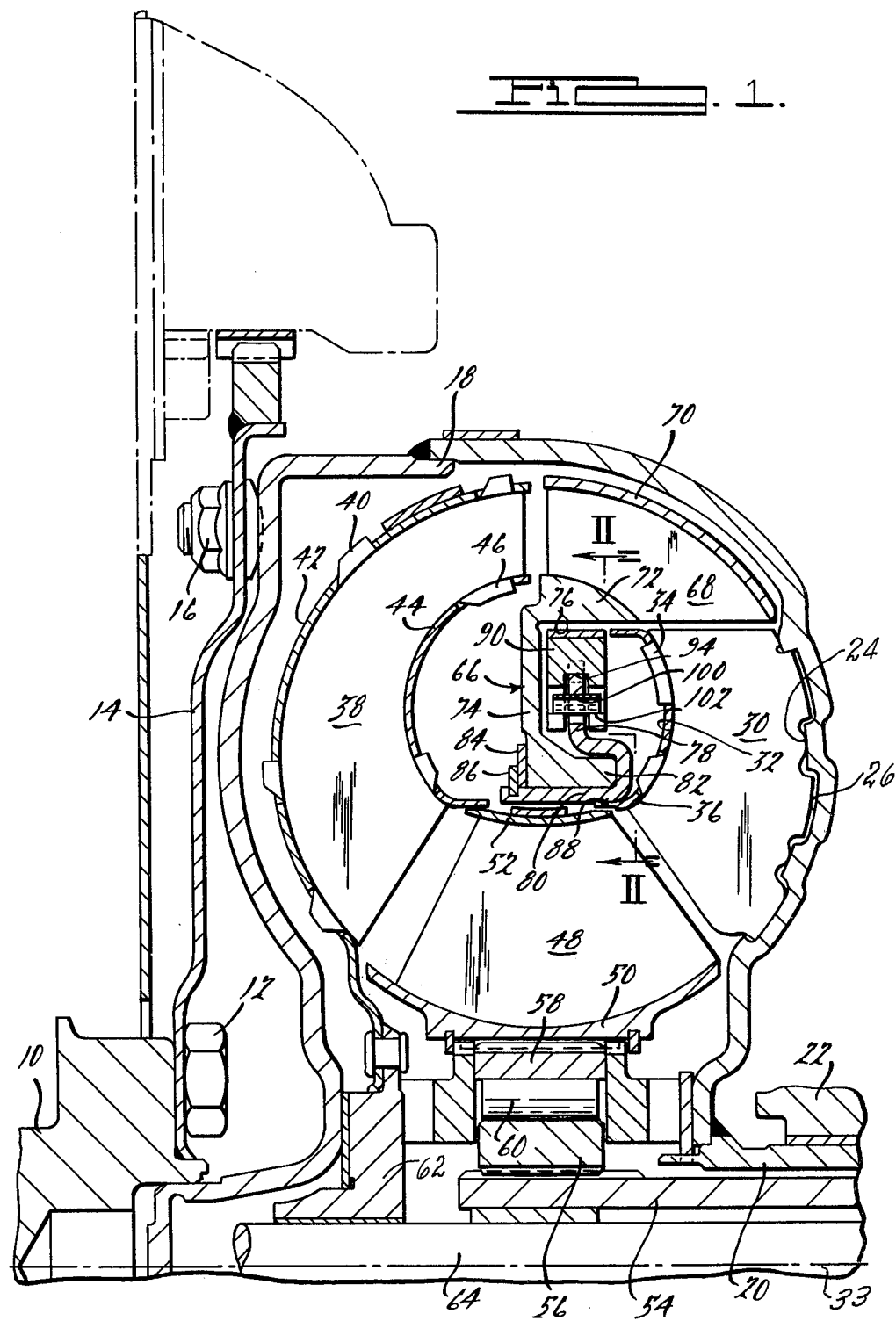
FIG. 1 shows a cross-sectional view of a hydrokinetic torque converter embodying the improvements of my invention.

Numeral 10 designates one end of the crankshaft of an internal combustion engine. It is connected by bolts 12 to drive plate 14, the outer margin of which is connected at 16 to impeller shell 18.

Impeller shell 18 is formed to define a closed, generally toroidal cavity. It includes a hub shaft 20, which is adapted to be journalled in an opening formed in housing 22 for a transmission.

The inner wall 24 of the impeller housing 18 is provided with a plurality of slots 26, which receive tabs 28 formed on the margin of main impeller blades 30. These impeller blades are arranged in a generally radial direction and are disposed in angularly spaced relationship about the axis 33 of the converter. The blades 30 define radial outflow passages. The inner margins 32 of the blades 30 are secured by tabs 34 to an inner shroud 36.

Turbine blades are shown generally at 38. They are secured by means of tabs 40 to an outer turbine shroud 42. An inner turbine shroud 44 is secured to the inner margins of the blades 38 by tabs 46. The blades 38 are arranged in angularly spaced relationship about the axis 33 to define radial inflow passages.

Stator blades 48 are arranged between the flow exit section of the turbine blades 38 and the flow entrance section of the impeller blades 30 described in U.S. Pat. No. 3,189,144. They alter the direction of the toroidal fluid flow to provide torque multiplication. The blades 48 are arranged radially; and they are secured at their radially inward margins to stator shroud 50. A radially outward stator shroud encircling the blades 48 is shown at 52.

A stationary stator sleeve shaft 54, which is connected to the stationary transmission housing is splined to an inner overrunning clutch race 56. An outer overrunning clutch race 58 is connected to the shroud 50. It is provided with internal cam surfaces to accommodate overrunning clutch rollers 60, whereby freewheeling motion of the stator in a direction opposite to the direction of rotation of the impeller is prevented although freewheeling motion in the same direction is permitted. The turbine shroud is connected to a turbine hub 62 which in turn is splined to turbine shaft 64.

The shrouds 36, 44 and 52 define the eye of the torus for the converter. Lockup clutch structure 66 is located in the eye. The lockup clutch structure is adapted to establish a driving connection between impeller blades 30 and auxiliary impeller blades 68. Impeller blades 68 are located at a radially outward location at the flow exit section of the impeller blades 30. Blades 68 define toroidal flow passages that form continuations of the flow passages defined by the blades 30. Flow passages defined by the blades 68 are defined in part also by an outer auxiliary blade shroud 70 and an inner auxiliary blade shroud 72. Shroud 72 forms a part of the clutch structure 66.

Clutch 66 comprises clutch member 74 which is formed with a circular clutch surface 76. A clutch disc 78 is located within the clutch element 74, and its inner peripheral margin 80 provides a support for the clutch element 74. The hub 82 of the clutch element 74 is adapted to rotate on the cylindrical bearing surface provided by the margin 80. Thrust washer 84 and snap ring 86 prevent axial displacement of the clutch element 74.

The disc 78 is connected to the shroud 36 by welding as shown at 88.

Brake shoe 90 is situated at the radially outward margin of the disc 78. Shoe 90 is shown also in detail in FIG. 2; and it is identical to other shoes, not shown, that are situated at angularly spaced locations about the periphery of the disc 78. Shoe 90 includes brake surface 92 arranged in close, juxtaposed relationship with respect to the surface 76 in the clutch element 74.

The inner side of shoe 90 is provided with a slot 94 which defines a cam surface 96 that registers with a cooperating cam surface 98 formed on the disc 78.

The disc 78 is formed with a slot 100 which extends in a direction generally parallel to the cam surface 98. A leaf spring 102 is inserted through the slot 100. The spring 102 is anchored at its center 104 against the upper margin of the slot 100. The ends of the spring 102 engage shoulders 106 and 108 formed on the shoe 90 whereby the shoe 90 normally is urged in a radially inward direction so that the friction surface 92 is out of registry with respect to the clutch surface 76 that surrounds it. Each of the shoes, only one of which is shown, operates in a manner similar to the shoe 90.

As indicated by the directional arrow, the clutch disc 78 and the main impeller rotate in a counterclockwise direction as viewed in the plane of FIG. 2. When the centrifugal force acting on the shoe 90 is sufficient to overcome the force of the spring 102, the shoe 90 will be urged radially outwardly. As clutch engagement occurs, the shoe 90 is wedged between the disc 78 and the surface 76, thereby locking the auxiliary impeller to the main impeller to cause both impellers to rotate together in unison.

When the vehicle is coasting to a stop with the engine throttle relaxed or closed, engine braking will occur in the usual fashion. Until the idle speed is approached (for example, when the impeller speed reaches approximately 1200 rpm), the centrifugal force acting on the clutch shoes 90 will be insufficient to maintain clutch engagement; and the clutch shoes will move radially inwardly thereby releasing the auxiliary impeller from the main impeller. This alters the size factor "K" for the converter. With a closed engine throttle the torque delivered from the engine to the transmission is minimal because of the increased size factor "K" and the engine is permitted to idle without a load. The transmission will not "drag down" the engine. Since the engine operates at idle with no load, the fuel economy is increased accordingly; and the engine idle speed may be adjusted to a minimum value; for example, at cold idle the engine speed may be about 1000 rpm; and at warm idle it may be as low as 500 or 600 rpm.

On start-up following idle operation, the engine throttle is depressed thereby causing the engine speed to rise above a value of approximately 1200 rpm at which time the clutch shoes will reengage so that the converter operates in the usual fashion to provide torque multiplication for acceleration purposes and to provide a relatively efficient coupling condition when the converter clutch point is reached. The stator freewheeling at that point is described in U.S. Pat. No. 3,189,144.

Having described a preferred embodiment of my invention, what I claim and desire to secure by U.S. Letters Pat. is:

1. A hydrokinetic torque converter for use in an automotive vehicle driveline having an engine and a torque delivery gear system, said converter comprising an impeller, a turbine and a stator arranged in toroidal fluid flow relationship in a torus circuit, said impeller being connected to said engine, said turbine being connected to a torque input element of said gear system, said impeller comprising a main impeller section and an auxiliary impeller section, each section having flow directing blades, the auxiliary section being located radially outward with respect to the main impeller section, and centrifugally operated clutch means for connecting drivably the auxiliary impeller section with the main impeller section, said clutch means comprising a first clutch element carried by said main impeller section, a second radially movable clutch element having formed thereon a friction surface and an annular internal clutch surface carried by said auxiliary blade section in proximity to the friction surface of said second clutch element, means for urging said second clutch element in a radially inward direction thus tending to disengage the clutch means, said second clutch element being moved radially outwardly at speeds greater than a predetermined value to effect friction engagement of said friction surface with said clutch surface.

2. The combination as set forth in claim 1 wherein the means for urging said second clutch element in a radially inward direction includes spring elements engageable with said second clutch element to urge the latter in a radially inward direction.

3. The combination as set forth in claim 1 wherein said turbine and said main impeller section have inner shrouds that partially define an annular toroidal eye for a torus flow path, said clutch means being disposed within the eye of the torus.

4. The combination as set forth in claim 2 wherein said turbine and said main impeller section have inner shrouds that partially define an annular toroidal eye for a torus flow path, said clutch means being disposed within the eye of the torus.

5. The combination as set forth in claim 3 wherein said first clutch element being journalled for relative rotation with respect to said second clutch element, said first clutch element being joined to and carrying said auxiliary blade section, said first clutch element defining an inner shroud for the auxiliary blade section, said internal clutch surface being formed in said inner shroud for said auxiliary blade section.

6. The combination as set forth in claim 4 wherein said first clutch element being journalled for relative rotation with respect to said second clutch element, said first clutch element being joined to and carrying said auxiliary blade section, said first clutch element defining an inner shroud for the auxiliary blade section, said internal clutch surface being formed in said inner shroud for said auxiliary blade section.

7. The combination as set forth in claim 1 wherein said first clutch element having a first cam surface formed thereon, a second cam surface formed on said second clutch element in registry with said first cam surface, tangential friction forces acting on said second clutch element tending to wedge the first and second clutch elements together thereby effecting a radial clutch engaging force as torque is applied to said main impeller section.

8. The combination as set forth in claim 2 wherein said first clutch element having a first cam surface formed thereon, a second cam surface formed on said second clutch element in registry with said first cam surface, tangential friction forces acting on said second clutch element tending to wedge the first and second clutch elements together thereby effecting a radial clutch engaging force as torque is applied to said main impeller section.

9. The combination as set forth in claim 3 wherein said first clutch element having a first cam surface formed thereon, a second cam surface formed on said second clutch element in registry with said first cam surface, tangential friction forces acting on said second clutch element tending to wedge the first and second clutch elements together thereby effecting a radial clutch engaging force as torque is applied to said main impeller section.

10. The combination as set forth in claim 4 wherein said first clutch element having a first cam surface formed thereon, a second cam surface formed on said second clutch element in registry with said first cam surface, tangential friction forces acting on said second clutch element tending to wedge the first and second clutch elements together thereby effecting a radial clutch engaging force as torque is applied to said main impeller section.

11. The combination as set forth in claim 5 wherein said first clutch element having a first cam surface formed thereon, a second cam surface formed on said second clutch element in registry with said first cam surface, tangential friction forces acting on said second clutch element tending to wedge the first and second clutch elements together thereby effecting a radial clutch engaging force as torque is applied to said main impeller section.

12. The combination as set forth in claim 6 wherein said first clutch element having a first cam surface formed thereon, a second cam surface formed on said second clutch element in registry with said first cam surface, tangential friction forces acting on said second clutch element tending to wedge the first and second clutch elements together thereby effecting a radial clutch engaging force as torque is applied to said main impeller section.

* * * * *